(12) United States Patent
Bedord et al.

(10) Patent No.: US 9,751,058 B2
(45) Date of Patent: Sep. 5, 2017

(54) AGRICULTURAL FEED MIXER TRANSMISSION TORQUE SENSOR ASSEMBLY

(71) Applicant: Patz Corporation, Pound, WI (US)

(72) Inventors: Bradley Bedord, Crivitz, WI (US); David C. Pellman, Coleman, WI (US)

(73) Assignee: Patz Corporation, Pound, WI (US)

( * ) Notice: Subject to any disclaimer, the term of this patent is extended or adjusted under 35 U.S.C. 154(b) by 0 days.

(21) Appl. No.: 15/257,551

(22) Filed: Sep. 6, 2016

(65) Prior Publication Data

US 2017/0065949 A1 Mar. 9, 2017

Related U.S. Application Data

(60) Provisional application No. 62/214,653, filed on Sep. 4, 2015, provisional application No. 62/214,654, filed
(Continued)

(51) Int. Cl.
*G01L 3/02* (2006.01)
*B01F 15/00* (2006.01)
(Continued)

(52) U.S. Cl.
CPC ........ *B01F 15/00201* (2013.01); *A01K 5/001* (2013.01); *A01K 5/004* (2013.01);
(Continued)

(58) Field of Classification Search
CPC .... B01F 15/00201; B01F 7/24; B01F 13/004; B01F 15/00155; B01F 15/00188; B01F 15/00311; B01F 15/0048; B01F 15/00538; A01K 5/001; A01K 5/004; A01K 5/02; B60K 25/02; F16H 57/025; F16H 61/0204; F16H 61/0206; G01L 3/108
(Continued)

(56) References Cited

U.S. PATENT DOCUMENTS 5,462,354 A 10/1995 Neier
6,758,426 B2 7/2004 Have
(Continued)

OTHER PUBLICATIONS

Pottinger—Torro Combiline Brochure—https://www.poettinger.at/download/prospekte/POETTINGER_TORRO-COMBILINE-_128.EN.1015.pdf; 2016.

*Primary Examiner* — Max Noori
(74) *Attorney, Agent, or Firm* — Nicholas A. Kees; Godfrey & Kahn, S.C.

(57) ABSTRACT

Described herein is an exemplary torque sensing assembly for a feed mixer that includes, a frame of a feed mixer, the frame having a first frame portion and a second frame portion; a transmission having at least two speeds, a housing, an input shaft, and an output shaft, a load cell secured to a second frame portion of the frame; a mounting plate having a first side portion and a second side portion situated opposite the first side, the transmission secured by a plurality of fasteners to a top surface of the mounting plate, hinge rotatably connecting the first side portion to the first frame portion, and a load contact point situated in contact with the load cell, wherein a resultant torque is impartable to the housing to provide a downward force on the load cell, via the load contact point.

12 Claims, 11 Drawing Sheets

Related U.S. Application Data on Sep. 4, 2015, provisional application No. 62/214,650, filed on Sep. 4, 2015, provisional application No. 62/298,240, filed on Feb. 22, 2016.

(51) Int. Cl.

| | | |
|---|---|---|
| *F16H 61/02* | (2006.01) | |
| *F16H 57/025* | (2012.01) | |
| *G01L 3/10* | (2006.01) | |
| *A01K 5/00* | (2006.01) | |
| *A01K 5/02* | (2006.01) | |
| *B60K 25/02* | (2006.01) | |
| *G05B 19/042* | (2006.01) | |
| *G05D 17/02* | (2006.01) | |
| *B01F 13/00* | (2006.01) | |
| *G05B 15/02* | (2006.01) | |
| *G05D 9/12* | (2006.01) | |
| *B01F 7/24* | (2006.01) | |
| *G05D 17/00* | (2006.01) | |

(52) U.S. Cl.
CPC ............... *A01K 5/02* (2013.01); *B01F 7/24* (2013.01); *B01F 13/004* (2013.01); *B01F 15/0048* (2013.01); *B01F 15/00155* (2013.01); *B01F 15/00188* (2013.01); *B01F 15/00311* (2013.01); *B01F 15/00538* (2013.01); *B60K 25/02* (2013.01); *F16H 57/025* (2013.01); *F16H 61/0204* (2013.01); *F16H 61/0206* (2013.01); *G01L 3/108* (2013.01); *G05B 15/02* (2013.01); *G05B 19/042* (2013.01); *G05D 9/12* (2013.01); *G05D 17/00* (2013.01); *G05D 17/02* (2013.01); *B01F 2015/00623* (2013.01); *B01F 2015/00629* (2013.01); *B01F 2215/0008* (2013.01); *B60K 2025/024* (2013.01); *G05B 2219/41358* (2013.01); *G05B 2219/49197* (2013.01); *G05B 2219/49255* (2013.01)

(58) Field of Classification Search
USPC .................................................. 73/862.191
See application file for complete search history.

(56) References Cited

U.S. PATENT DOCUMENTS

| | | | |
|---|---|---|---|
| 7,341,372 B2 | 3/2008 | Van Der Plas | |
| 8,354,961 B2* | 1/2013 | Kawasaki | G01S 3/48 342/442 |
| 8,850,910 B1 | 10/2014 | Have | |
| 2006/0256647 A1* | 11/2006 | Van Der Plas | A01K 5/004 366/141 |
| 2012/0008457 A1* | 1/2012 | Neier | A01K 5/004 366/190 |
| 2016/0343231 A1* | 11/2016 | Bump | B01F 13/004 |
| 2017/0068259 A1* | 3/2017 | Patz | B60K 25/02 |

* cited by examiner

AGRICULTURAL FEED MIXER TRANSMISSION TORQUE SENSOR ASSEMBLY

CROSS-REFERENCE TO RELATED APPLICATIONS

This application claims priority from U.S. Provisional Patent Application Ser. No. 62/214,653, filed on Sep. 4, 2015, U.S. Provisional Patent Application Ser. No. 62/214,654, filed on Sep. 4, 2015, U.S. Provisional Patent Application Ser. No. 62/214,650, filed on Sep. 4, 2015, and U.S. Provisional Patent Application Ser. No. 62/298,240, filed on Feb. 22, 2016, all of which are incorporated herein by reference for all purposes.

FIELD OF THE INVENTION

This invention relates to the field of agricultural feed mixers and the means of which to drive/transmit and control power from the main power source to at least one mixing element or screw. This invention also relates to the field of sensing and determining the torque demand/loading on an agricultural feed mixer drive train.

BACKGROUND

Agricultural feed mixers, often termed Total Mixed Ration (TMR) Mixers, have a goal of providing a homogenous mixture of ingredients that constitute a ration to be fed to livestock for maximum production, whether that production is milk or meat.

There are known methods of controlling the transmission of power from the main power source, usually a tractor engine, connected to the mixing element(s) of a livestock feed mixer by means of a power take-off (PTO) output (e.g., a shaft, belt, etc.). Traditionally this had been done by using a direct drive connection from the tractor engine, through the PTO, to the mixing elements. Variation in the speed of the mixing elements in a direct drive arrangement is achieved by varying the speed of the engine of the tractor. The advent of larger systems and the attendant increase in power demand brought about the use of multi-speed gearboxes having at least two speed ranges or ratios, where a first speed produces a lower output speed than a second speed, but requires less power. One known method of selecting or shifting between the first speed and the second speed is by manual actuation of a shift lever. This method forces the operator to stop the PTO, manually shift the lever to change gears, and then engage the PTO again with the transmission in the different gear, to resume mixing at a different speed. This method wastes time for the operator and reduces the efficiency of the mixing process. This solution also relies on the operator to decide to shift the gearbox at an appropriate time, so as to avoid damage to the drive system components (tractor, engine, drivelines, multi-speed gearbox, mixing element gearbox/reducers), by exceeding their designed loading limits. For an operator, some of the primary indications of the magnitude of loading on these components are visual cues of how full the mixing chamber is, the weight inside the mixing chamber if equipped with a scale system, and possibly an audible cue of the strain on the main power source, such as the tractor engine.

SUMMARY OF THE INVENTION

In at least some embodiments, a torque sensing assembly for a feed mixer is provided, comprising: a frame of a feed mixer, the frame having a first frame portion and a second frame portion; a transmission having at least two speeds, a housing, an input shaft, and an output shaft; a load cell secured to the second frame portion; a mounting plate having a first side portion and a second side portion situated opposite the first side, the transmission secured by a plurality of fasteners to a top surface of the mounting plate; a hinge rotatably connecting the first side portion to the first frame portion; and a load contact point situated on the second side portion and in contact with the load cell, wherein a resultant torque generated by at least one of the input shaft and output shaft is impartable to the housing to provide a downward force on the load cell, via the load contact point, such that an output value is generated by the load cell representative of the resultant torque.

In at least some additional embodiments, a torque sensing assembly for a feed mixer is provided, comprising: a frame of a feed mixer, the frame having a first frame portion and a second frame portion; a transmission having at least two speeds, a transmission housing, an input shaft, and an output shaft; a mounting plate having, mounting plate top surface, a first side portion and a second side portion situated opposite the first side, the first side portion rigidly secured to the first frame portion, the second side portion rigidly secured to the second frame portion, and the transmission secured by a plurality of fasteners to a top surface of the mounting plate; a load cell situated between the transmission housing and the mounting plate top surface, and configured to measure at least one of a tensile and compressive load exerted on the mounting plate by the transmission when the transmission is under load; and an output value generated by the load cell representative of the at least one of a tensile and compressive load.

In at least some additional embodiments, a torque sensing assembly for a feed mixer is provided, comprising: a frame of a feed mixer, the frame having a first frame portion and a second frame portion; one or more load cells secured to the frame; a transmission mounting plate having a top, a bottom, a first side portion, and a second side portion situated opposite the first side, wherein the first side portion is rigidly secured to the first frame portion; a transmission having at least two speeds, a housing, an input shaft, and an output shaft; the transmission secured to a top surface of the transmission mounting plate by a plurality of fasteners; and a load contact point situated along a bottom of the second side portion and in contact with the one or more load cells, wherein a resultant torque generated by at least one of the input shaft and output shaft is impartable to the housing to provide a downward force on the one or more load cells, via the load contact point, such that an output value is generated by the one or more load cells representative of the resultant torque.

In at least another additional embodiment, a torque sensing assembly for a feed mixer is provided, comprising: a frame of a feed mixer, the frame having a first frame portion and a second frame portion; one or more load cells secured to the frame; a transmission mounting plate having a top, a bottom, a first side portion, and a second side portion situated opposite the first side, wherein the first side portion is rigidly secured to the first frame portion; a transmission having at least two speeds, a housing, an input shaft, and an output shaft; the transmission secured to a top surface of the transmission mounting plate by a plurality of fasteners; and a load contact point situated along a bottom of the second side portion and in contact with the one or more load cells, wherein a resultant torque generated by at least one of the input shaft and output shaft is impartable to the housing to provide a downward force on the one or more load cells, via the load contact point, such that an output value is generated by the one or more load cells representative of the resultant torque.

DETAILED DESCRIPTION

Figure 1:
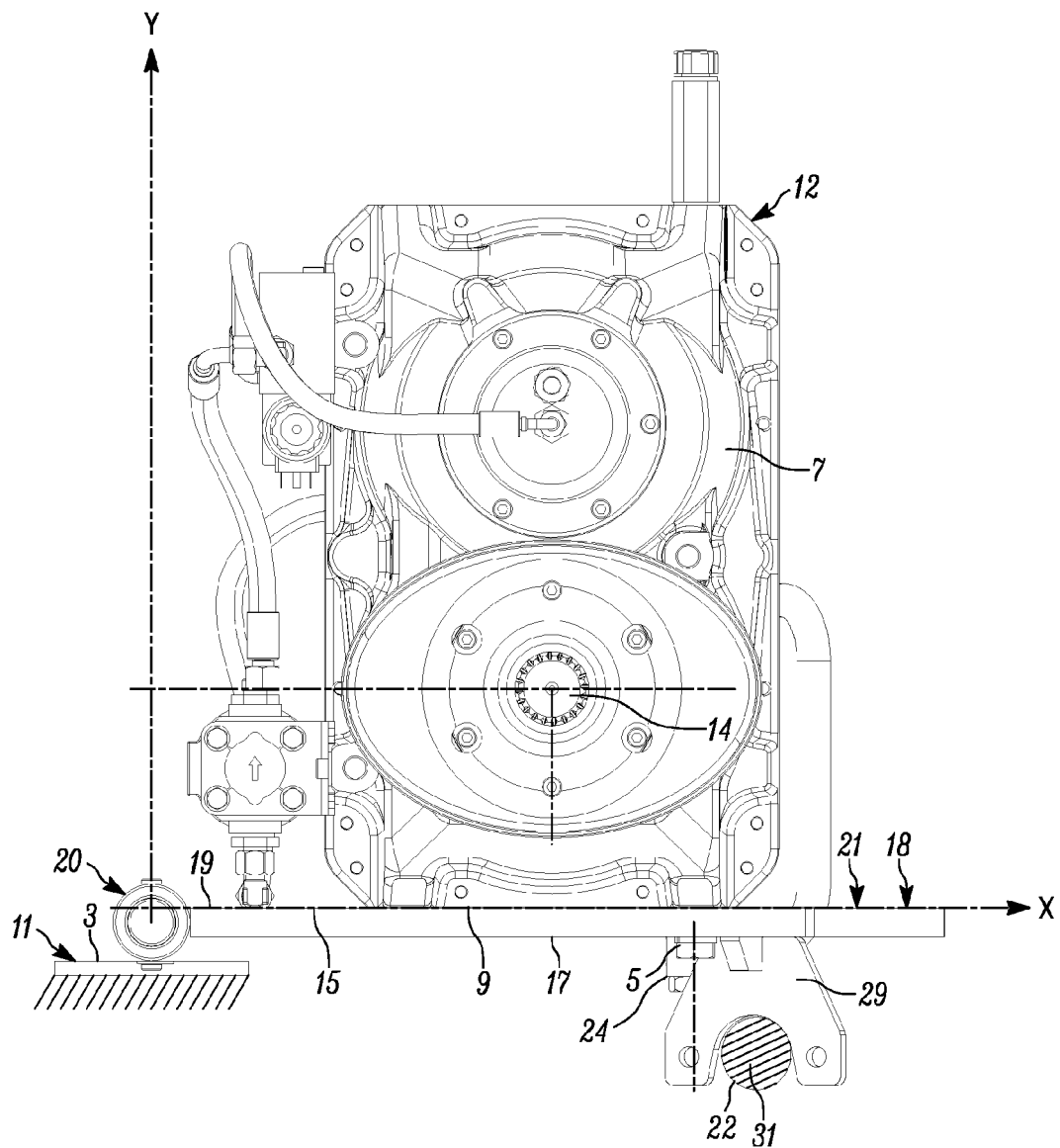
FIG. 1 shows a front elevation view of an exemplary transmission equipped according to the invention in a schematic representation, shown with certain structural elements removed to show elements of a torque sensor assembly.
Figure 2:
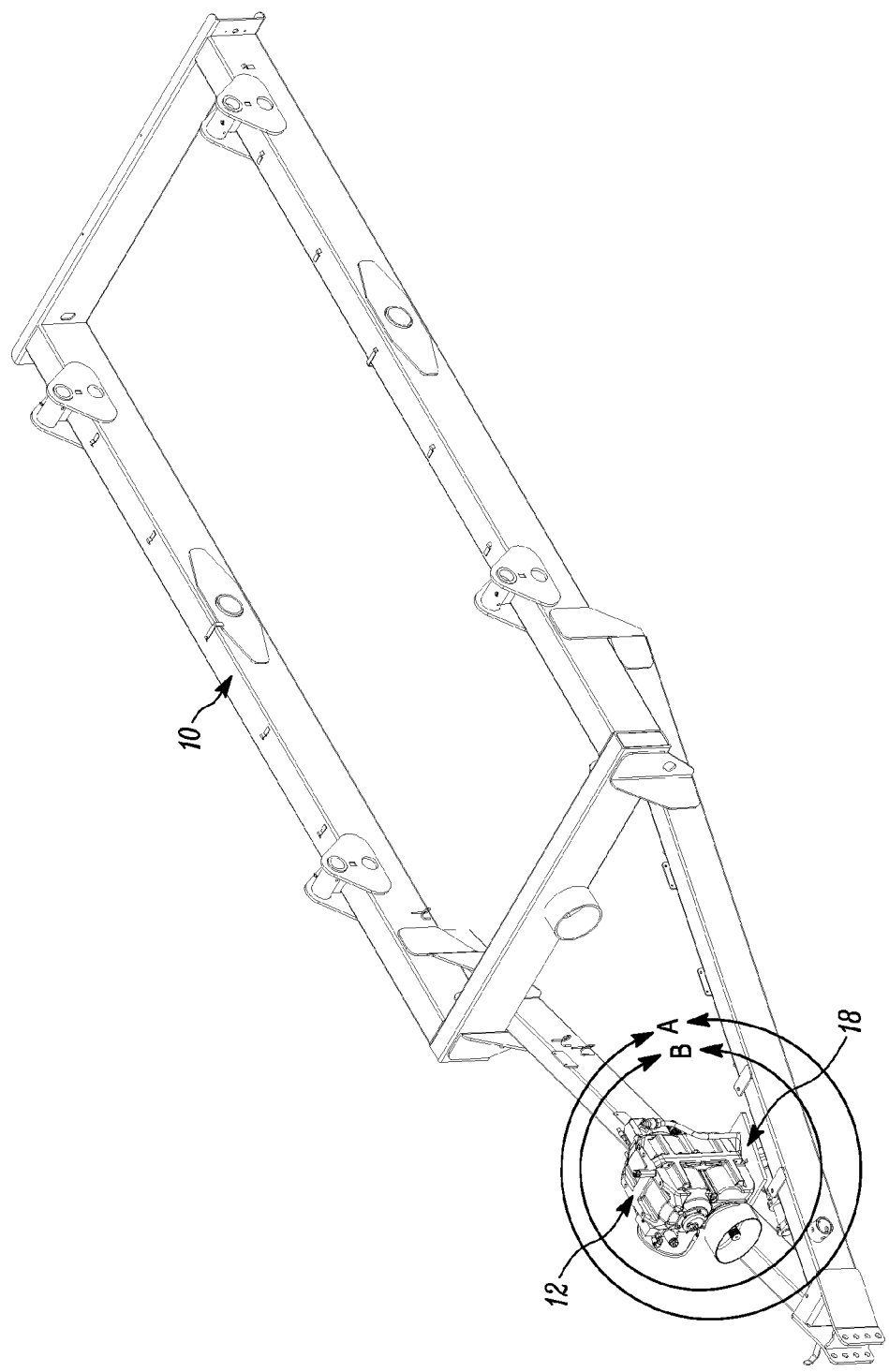
FIG. 2 is an isometric view of an exemplary frame of a feed mixer with the transmission mounted to the frame as shown in FIG. 1 by means of a torque sensor assembly according to an exemplary embodiment of the invention.
Figure 3:
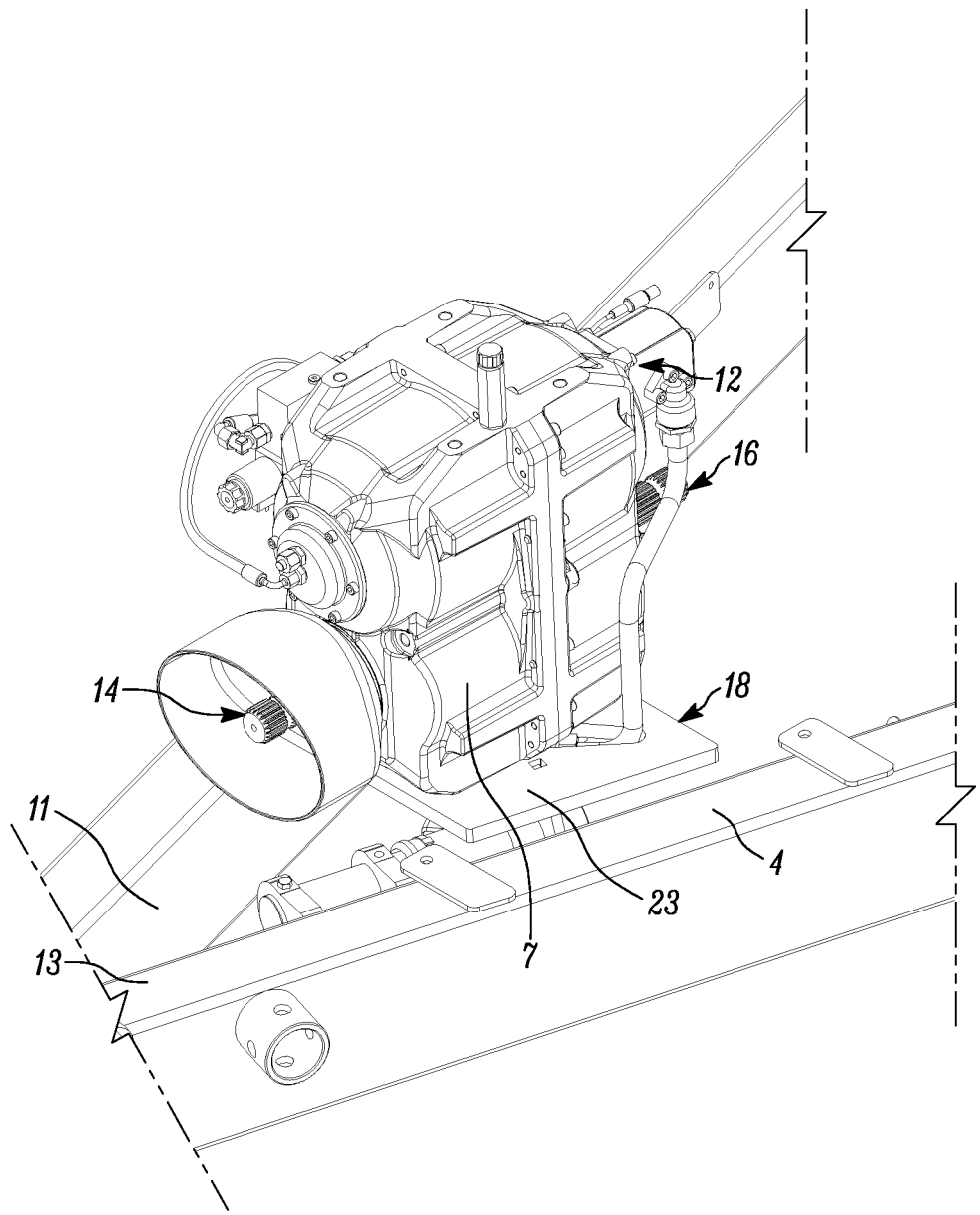
FIG. 3 is an isometric view of the transmission, transmission mount, and frame portion shown in FIG. 2.
Figure 4:
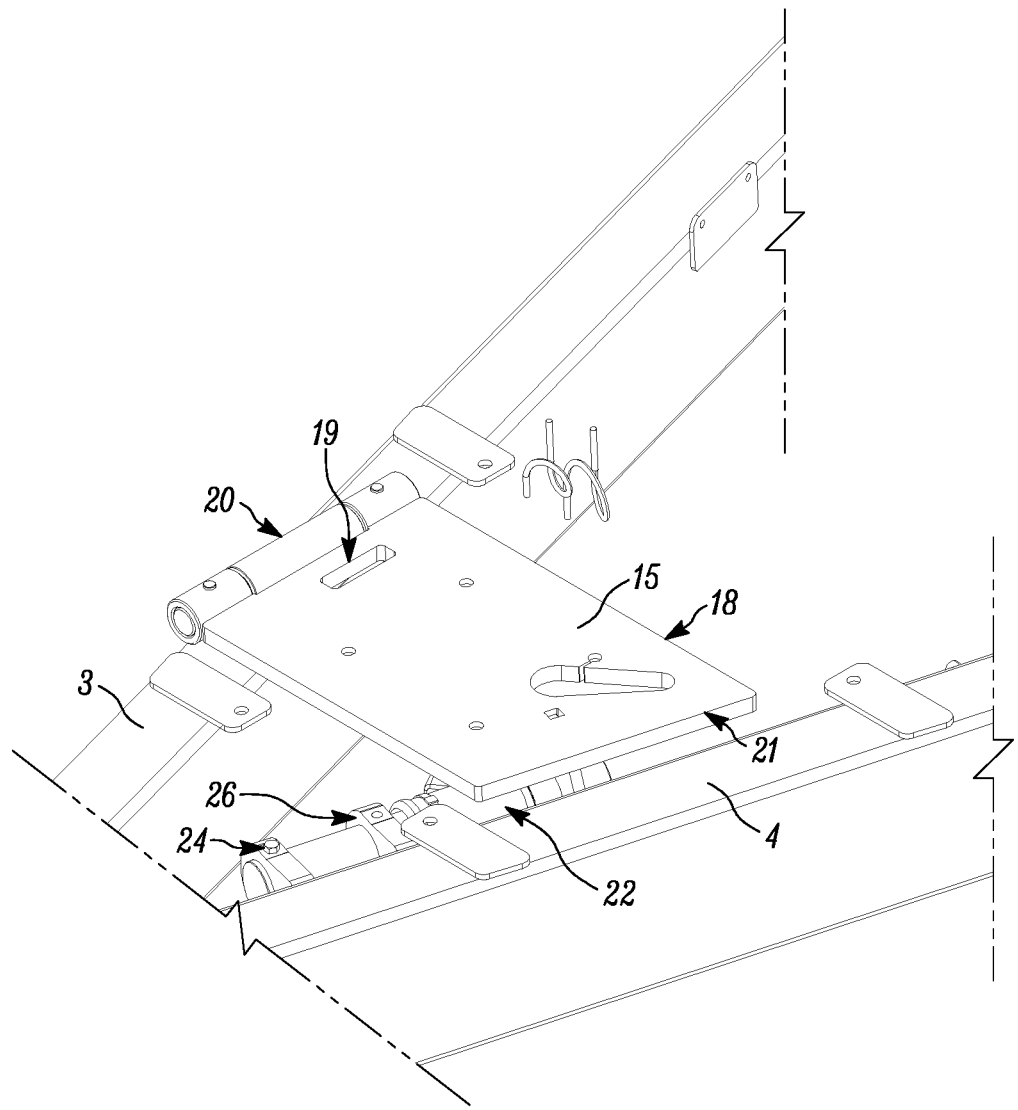
FIG. 4 is an isometric view of the transmission mount shown in FIGS. 2 and 3, with the transmission removed to reveal the mount more clearly.

One method to determine when a transmission gear ratio should be changed to maintain optimal efficiency is to sense the torque being exerted by the drive train on the mixer, and to shift the transmission based on certain predetermined torque values. One such exemplary torque sensing assembly is described herein for use with a transmission on an agricultural feed mixer, which can include various types of feed mixers, including but not limited to trailer-mounted, truck-mounted, or stationary. As shown in the drawing figures, the invention includes a frame 10, suitable for use in numerous variants for various devices, such as a feed mixer. The frame 10 includes a first frame portion 11 and a second frame portion 13, the first frame portion having a first frame portion top surface 3 and the second frame portion having a second frame portion top surface 4. Mounted to the frame 10 is a multi-speed transmission 12, having a housing 7 with a housing bottom 9, an input shaft 14 and an output shaft 16. The transmission 12 is electronically controlled and therefore is shiftable by means of an input signal directing the transmission to shift between two or more different gears output ratios (e.g., gears), in terms of the relative speed of rotation of the input shaft 14 and the output shaft 16. An exemplary two-speed transmission is a Model 60007780, as manufactured by Zuidberg, located in De Ens, Netherlands, although various other transmissions having two or more different output ratios can be used.

Figure 5:
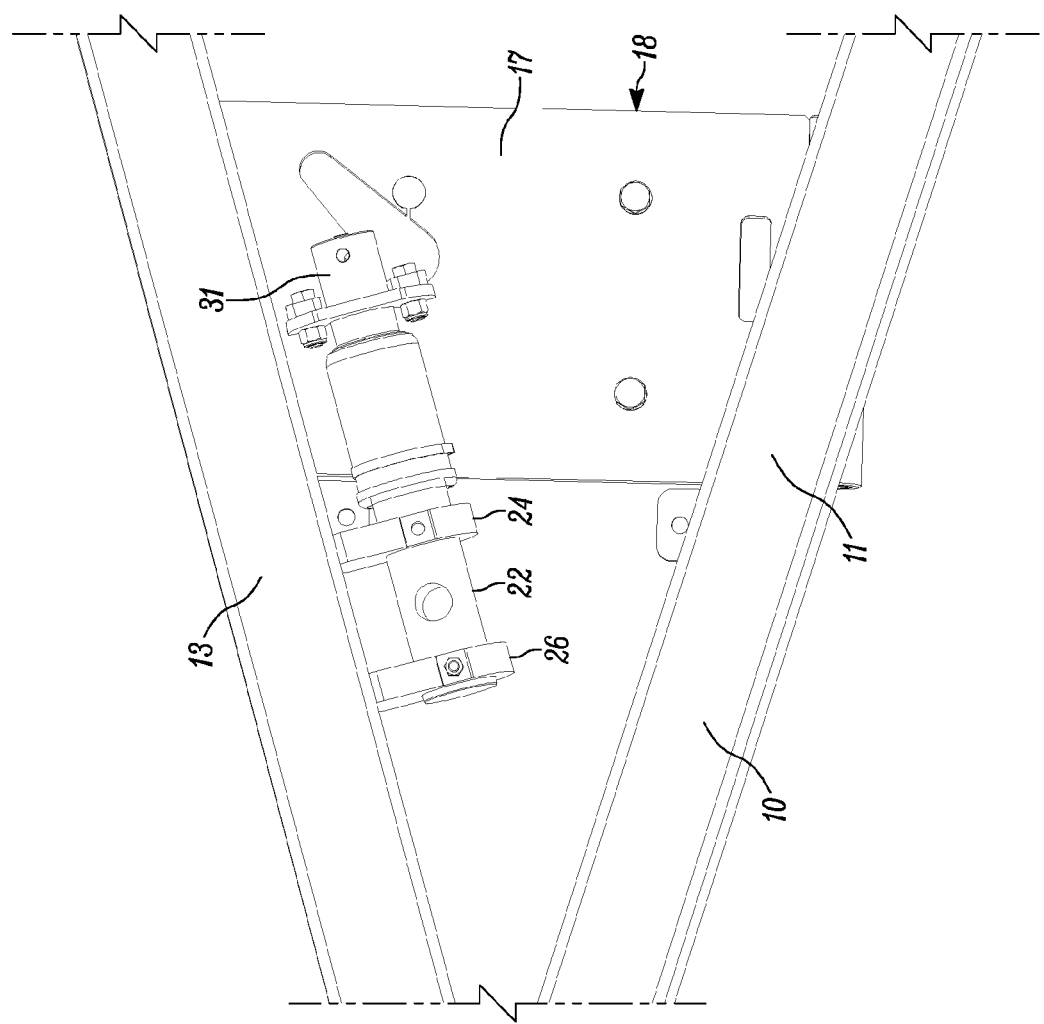
FIG. 5 is a bottom plan view of the transmission mount as shown in FIG. 4, with the transmission removed, showing the load cell mounting to the frame.

In at least some embodiments, the transmission 12 is secured to a mounting plate top surface 23 of a mounting plate 18 using a plurality of transmission fasteners 5, wherein the mounting plate 18 is secured to the frame 10. The mounting plate 18 includes a top 15 and a bottom 17, wherein the top 15 includes the mounting plate top surface 23. In addition, the mounting plate 18 includes a first side portion 19 that is rotatably connected to the first frame portion 11 by means of a hinge 20 (or another suitable support) secured thereto, so that the mounting plate 18 rotates along arc (such as $M_P$ in FIG. 11) relative to the first frame portion 11. The frame 10 further includes one or more load cell mounts 24, 26 (FIG. 5), which are rigidly secured to the second frame portion 13. One or more load cell(s) 22 are secured to the frame 10 by the load cell mounts 24, 26 or another suitable means. While a load cell of various kinds may be used, one example of an appropriate load cell is a Model 969-0214, as manufactured by Dinamica Generale, located in Poggio Rusco MN, Italy.

Figure 6:
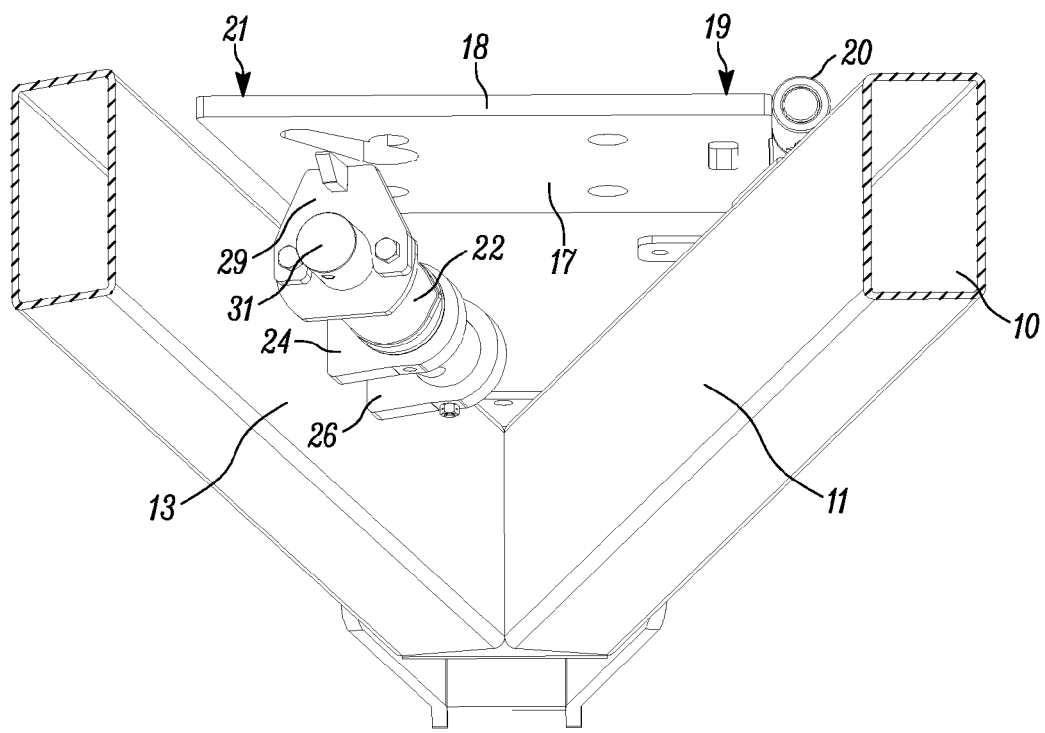
FIG. 6 is a lower isometric view of the frame, load cell, and transmission mount illustrated in FIG. 5.

The mounting plate 18 further includes a second side portion 21 (opposite of first side) having a load portion 29 secured to or formed therefrom. In at least some embodiments, as shown in FIG. 6, the load portion 29 is secured along the bottom side 17 of the second side portion 21. The load portion 29 can take many forms, such as a bracket, a protrusion, a depression, etc. Further, the load portion 29 is secured to or otherwise in contact with a load sensing portion 31 of the load cell 22. In this manner, the second side portion 21 of the mounting plate 18 is supported by the load cell 22. As such, a load situated on or otherwise imparted to the mounting plate 18, can be sensed by the load cell 22. Various configurations of connectors, linkages, etc. can be used to interconnect the second side portion 21 with the load cell 22.

Figure 9:
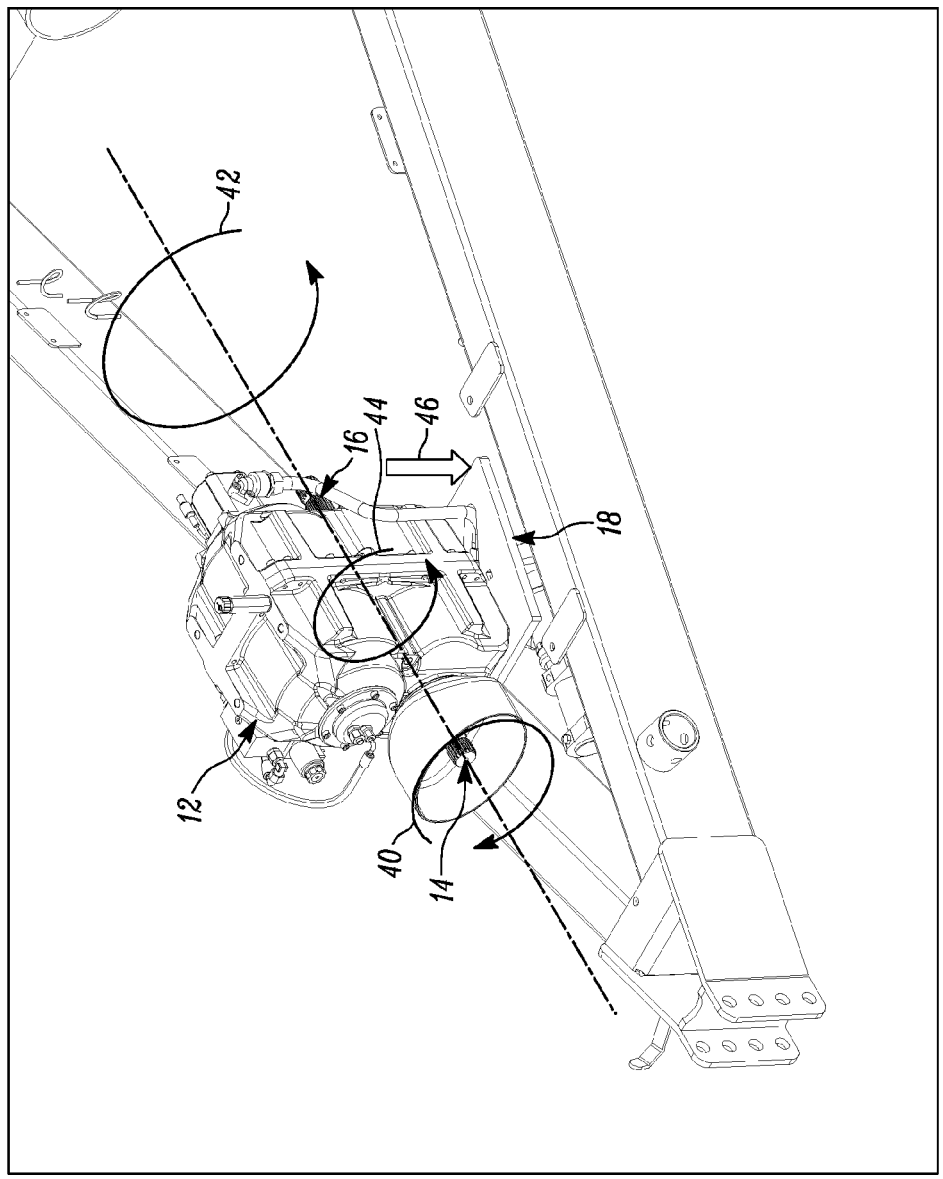
FIG. 9 is an isometric view of the transmission, transmission mount, and frame portion showing various rotational components.

As indicated above, the transmission 12 includes at least two gear ratios, a high speed and low speed. As rotational motion and torque is imparted to the transmission input shaft 14, to drive the load, the rotational speed of the output shaft 16 will be divided by the selected gear ratio within transmission 12. Likewise, the output torque will be multiplied by the selected gear ratio. The difference between the input torque and the output torque produces a resultant torque. This resultant torque is transmitted to mounting plate 18 causing it to create a force on load cell 22. For illustrative purposes, as illustrated in FIG. 9, the input torque is shown as an input rotational component 40 (clockwise), the output torque is shown as an output rotational component 42 (counter-clockwise), whereas the resultant torque on the transmission 12 is shown as a resultant rotational component 44 (also counter-clockwise). This configuration produces a downward force component 46 on the mounting plate 18. As the first side 19 of the mounting plate 18 is rotatably secured to the frame 10, the second side 21 is free to push downward on the load cell 22. In this manner, as the input torque increases, so will the force applied to load cell 22. Although illustrated with the hinge 20 on the first frame portion 11, and the load cell 22 on the second frame portion 13, the hinge 20 and load cell 22 can be reversed in position.

Load cell 22 is designed to measure the force applied thereto and provide an output value (signal) representative of the force measured. This output value can then be utilized as is, in terms of force on the load cell 22, or it can be converted to reflect the resultant torque about input shaft 14 and output shaft 16, using various known component parameters. The output value can then be used as an input signal to control functions on a system such as a feed mixer, such as to control which gear the transmission 12 is or should be in to provide one or more of efficiency, safety, etc. For example, a high output value received from the load cell 22 can indicate that the torque or force endured by the transmission is too high, and that the transmission should be shifted into a lower gear to reduce the strain on the transmission or other drive system components associated therewith. In this manner, a specific pre-determined acceptable value can be utilized for comparison with the output from the load cell 22. In at least some embodiments, the output can also be used for various other types of control, such as to control the sequencing of doors, conveyors, etc., which may be affixed to feed mixer systems or other devices and system utilizing the invention.

In at least one embodiment, the hinge 20 can be omitted, wherein the first side 19 is rigidly secured to the first frame portion 11, such as by welding, fastening, gluing, etc. In this manner, the mounting plate 18 does not rotate as freely as when hinged, but will bend or otherwise deform along at least a portion of its length to allow for a reaction force at the load cell 22 to be provided at the second side 20 (which is not rigidly held in place) as discussed above.

Figure 7:
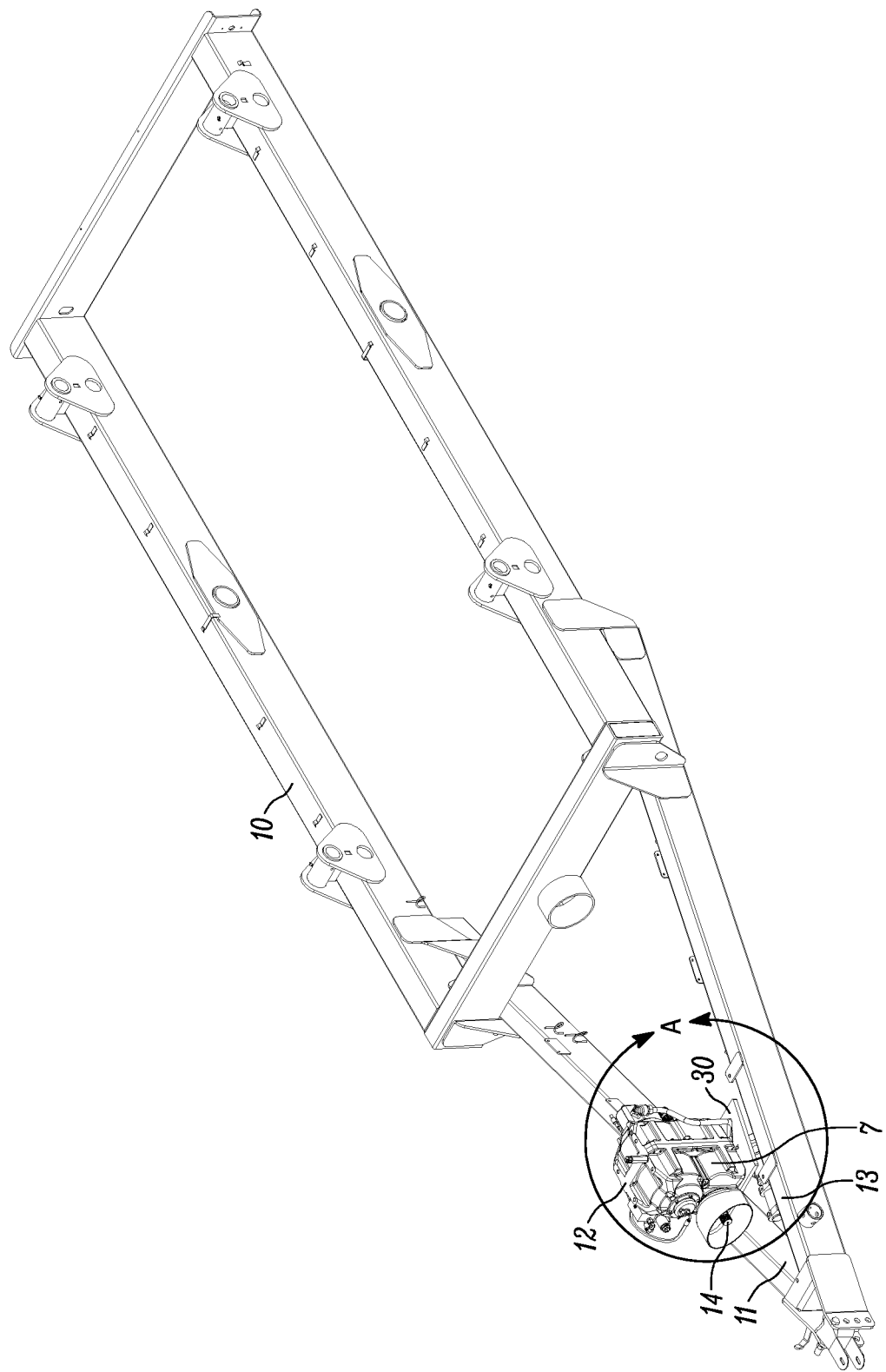
FIG. 7 is an isometric view of an exemplary frame of a feed mixer with the transmission mounted to the frame by means of a torque sensor assembly, according to an exemplary embodiment of the invention.
Figure 8:
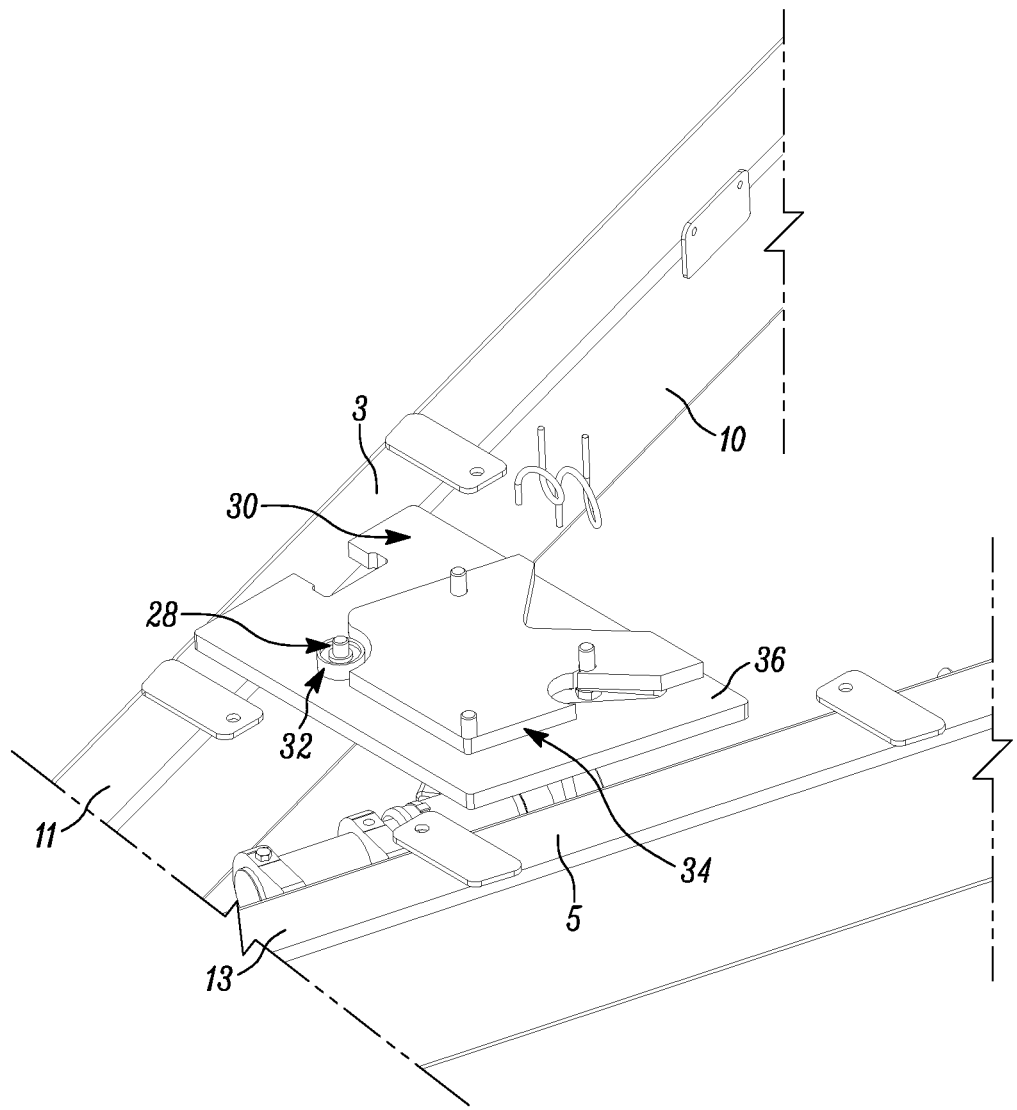
FIG. 8 is an isometric view of the transmission mount, and frame portion shown in FIG. 7.

In another embodiment of the invention, as shown in FIGS. 7 and 8. The frame 10 and transmission 12 remain substantially as described above, although a mounting plate 30 is welded or otherwise rigidly connected to the first frame portion 11 and second frame portion 13, without permitting rotation relative to the frame 10. In this configuration, the resultant torque of the transmission 12 can be measured at one or more mounting bolts 28 by which the transmission 12 is mounted to the mounting plate 30. This measurement is accomplished by placing one or more load cells 32 between the mounting plate 30 and the transmission 12. In at least some embodiments, load cell 32 is a donut-style load cell, such as a Model LTH-500, as manufactured by Futek, although in other embodiments, various other types of load cells can be utilized. In at least some embodiments, one or more load cells 32 are situated at or adjacent to the housing bottom 9 of the transmission housing 7, such that the transmission 12 is at least partially supported by one or more load cells 32. In at least some embodiments, a single load cell 32 can be placed on one corner of the housing bottom 9 between the housing bottom 9 and a top surface 36 of the top 15. In such a configuration, a rigid or semi-rigid spacer 34, in the form of a plate or discrete portions, can be used to support the transmission 12. In this manner, the resultant torque on the transmission 12, such as resultant rotational component 44 is imparted as a compressive or tensile load on the load cell 32. This tensile or compressive load may be converted mathematically to reflect the resultant torque or force acting on the transmission 12 or associated drive system components.

Figure 10:
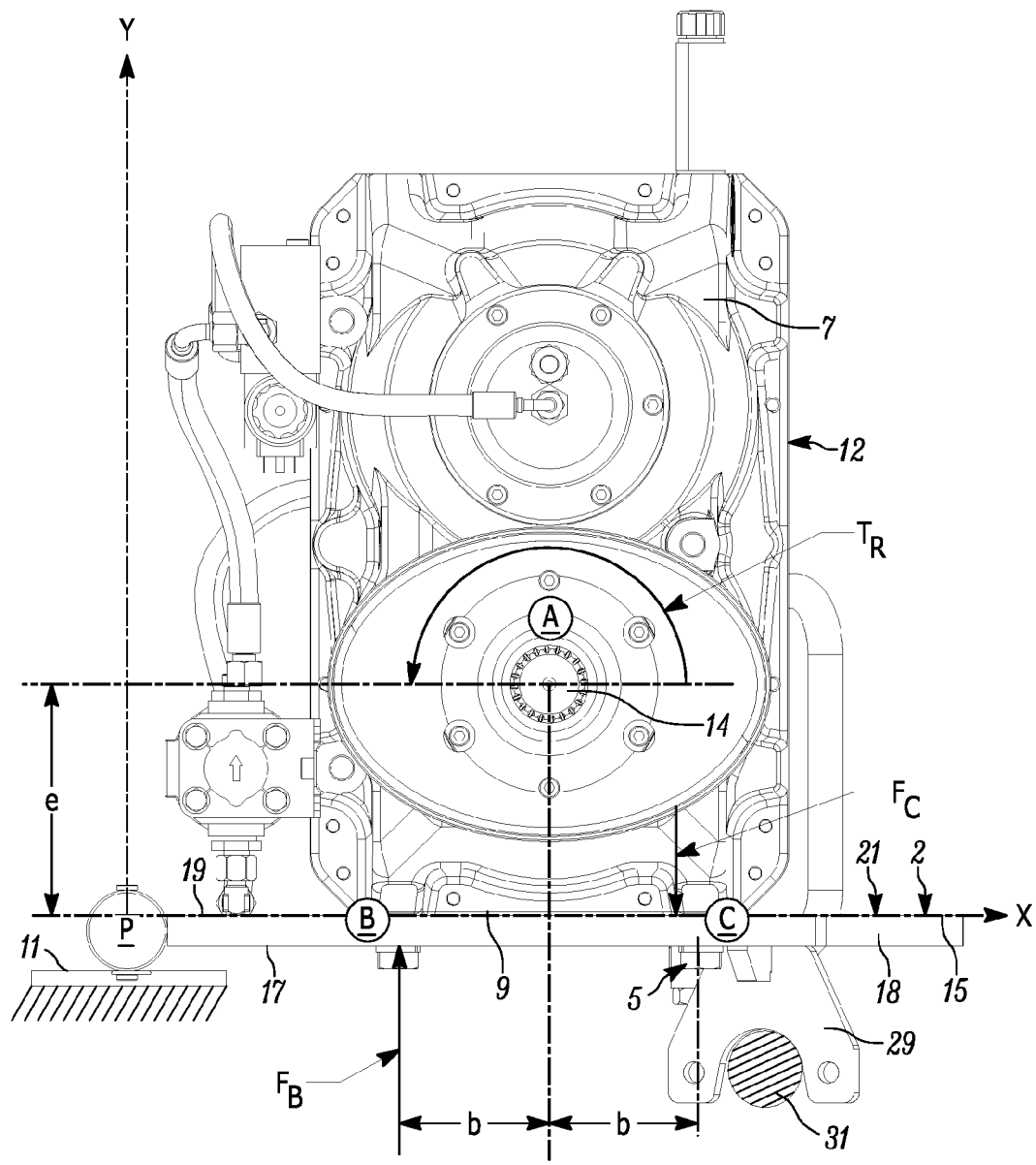
FIG. 10 is the front elevation view of the exemplary transmission in FIG. 1, further depicting various forces and geometry.
Figure 11:
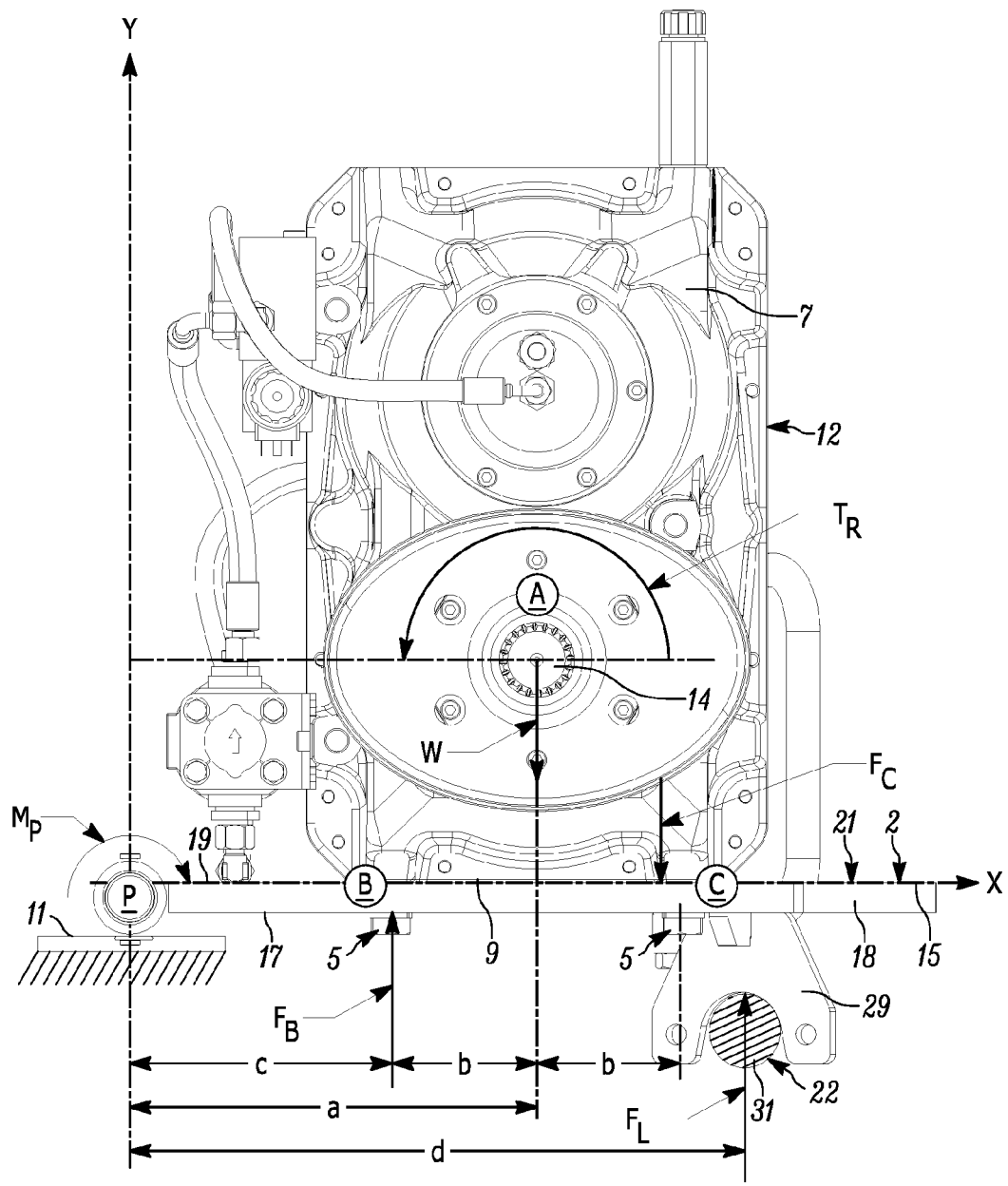
FIG. 11 is the front elevation view of the exemplary transmission in FIG. 10, depicting additional forces.

Referring now to FIGS. 9-11, a further depiction of forces imparted about the transmission 12, as well as an exemplary method of calculating the reaction force experienced by load cell 22 is described. As shown in FIGS. 9-11, the transmission 12 is secured to the mounting plate 18, which is rotatably secured to frame 10, and supported by the load sensing portion 31 of load cell 22, as described above. The resultant torque (i.e., resultant rotational component 44) is identified in the following equations, as $T_r$, the transmission 12 has a gear reduction r between the input shaft 14 and the output shaft 16 and therefore the Torque output $T_{out}$ can be expressed using Equation 1.

$$T_{out}=T_{in}(r) \qquad \text{Equation 1}$$

When the transmission 12 has a parallel gearbox (input shaft and output shaft axis lie on the same plane), the resultant torque $T_r$ (resultant rotational component 44) acting on the transmission 12 is defined by Equation 2.

$$T_r=T_{out}-T_{in} \qquad \text{Equation 2}$$

Substituting Equation 1 into Equation 2 yields the following:

$$T_r=T_{in}(r)-T_{in} \qquad \text{Equation 3}$$

As shown in FIG. 10, the resultant torque $T_r$ is transferred to the transmission fasteners 5 at locations B and C. The reaction forces $F_B$ and $F_C$ must counteract $T_r$ to keep the transmission 12 in place relative to the mounting plate 18, thus Equation 4 holds true, where $M_A$ is the moment about point "A".

$$\Sigma M_A=0=T_r-F_B(b)-F_C(b) \qquad \text{Equation 4}$$

Solving Equation 4 for $T_r$ yields:

$$T_r=F_B(b)-F_C(b) \qquad \text{Equation 5}$$

and due to symmetry Equation 6 holds true:

$$F_B=F_C \qquad \text{Equation 6}$$

Referring to FIG. 11, additional elements are identified, namely, a weight vector W of the transmission 12 acting on point A and the reaction force $F_L$ on the load cell 22. The summation of moments about pivot point P, which is designated by $M_P$, must equal zero to keep the transmission 12 and mounting plate 18 from moving about pivot point P (equilibrium) as provided in Equation 7.

$$\Sigma M_P=0=F_B(c)-W(a)-F_c(a+b)+F_L(d) \qquad \text{Equation 7}$$

Solving Equation 7 for reaction force at the load cell force, $F_L$ $$F_L = \frac{-F_B(c) + W(a) + F_c(a+b)}{d} \qquad \text{Equation 8}$$

Equation 8 illustrates that as torque demand increases, so does the reaction force $F_L$ at the load cell 22. This increase will be in a linear and predictable manner. $F_L$ can now be measured directly and be used to calculate the torque demand on the system.

It is to be noted that all "pre-determined" values discussed herein can be considered "acceptable", wherein the term "acceptable" is understood to include operational values that are derived based on the operational limitations as specified by a manufacturer of the component, or otherwise derived based on reasonable expectations of safe operational parameters by a person skilled in the art of manufacturing feed mixers or the associated components. Further, it is to be noted that the term "torque value" can in some embodiments, include either one of, or both of, instantaneous torque and average torque. In addition, it is to be understood that although the invention has been herein described in application with a feed mixer transmission, the invention can be equally applicable with other transmission driven machinery.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A torque sensing assembly for a feed mixer comprising:
   a frame of a feed mixer, the frame having a first frame portion and a second frame portion;
   a transmission having at least two speeds, a housing, an input shaft, and an output shaft;
   a load cell secured to the second frame portion;
   a mounting plate having a first side portion and a second side portion situated opposite the first side portion, the transmission secured by a plurality of fasteners to a top surface of the mounting plate;
   a hinge rotatably connecting the first side portion to the first frame portion; and
   a load contact point situated on the second side portion and in contact with the load cell, wherein a resultant torque generated by the input shaft and output shaft is impartable to the housing to provide a downward force on the load cell, via the load contact point, such that an output value is generated by the load cell representative of the resultant torque.

2. The assembly of claim 1, wherein the hinge is secured to a first frame portion top surface of the first frame portion.

3. The assembly of claim 1, wherein the output shaft is interconnected with a mixing element of the feed mixer.

4. The assembly of claim 3, wherein the output value generated by the load cell is utilized by the feed mixer to determine when the transmission is to be shifted between the at least two speeds.

5. A transmission torque sensing assembly for a feed mixer comprising:
   a frame of a feed mixer, the frame having a first frame portion and a second frame portion;
   a transmission having at least two speeds, a transmission housing, an input shaft, and an output shaft;
   a mounting plate having, a mounting plate top surface, a first side portion and a second side portion situated opposite the first side portion, the first side portion rigidly secured to the first frame portion, the second side portion rigidly secured to the second frame portion, and the transmission secured by a plurality of fasteners to a mounting plate top surface of the mounting plate;
   a load cell situated between the transmission housing and the mounting plate top surface, and configured to measure at least one of a tensile and compressive load exerted on the mounting plate by the transmission when the transmission is under load; and
   an output value generated by the load cell representative of the at least one of a tensile and compressive load.

6. The assembly of claim 5, wherein the first side portion is secured to a first frame portion top surface of the first frame portion and the second side portion is secured to a second frame portion top surface of the second frame portion.

7. The assembly of claim 6, wherein the output shaft is interconnected with a mixing element of the feed mixer.

8. The assembly of claim 7, wherein the output value generated by the load cell is utilized by the feed mixer to determine when the transmission is to be shifted between the at least two speeds.

9. A transmission torque sensing assembly for a feed mixer comprising:
   a frame of a feed mixer, the frame having a first frame portion and a second frame portion;
   one or more load cells secured to the frame;
   a transmission mounting plate having a top, a bottom, a first side portion, and a second side portion situated opposite the first side portion, wherein the first side portion is rigidly secured to the first frame portion;
   a transmission having at least two speeds, a housing, an input shaft, and an output shaft; the transmission secured to a top surface of the transmission mounting plate by a plurality of fasteners; and
   a load contact point situated along a bottom of the second side portion and in contact with the one or more load cells, wherein a resultant torque generated by the input shaft and output shaft is impartable to the housing to provide a downward force on the one or more load cells, via the load contact point, such that an output value is generated by the one or more load cells representative of the resultant torque.

10. The assembly of claim 9, wherein the first side portion is secured to a first frame portion top surface of the first frame portion.

11. The assembly of claim 10, wherein the output shaft is interconnected with a mixing element of the feed mixer.

12. The assembly of claim 10, wherein the output value generated by the one or more load cells is utilized by the feed mixer to determine when the transmission is to be shifted between the at least two speeds.

* * * * *